(No Model.)
R. GARDNER.
PEANUT PLANTER.
No. 381,357. Patented Apr. 17, 1888.
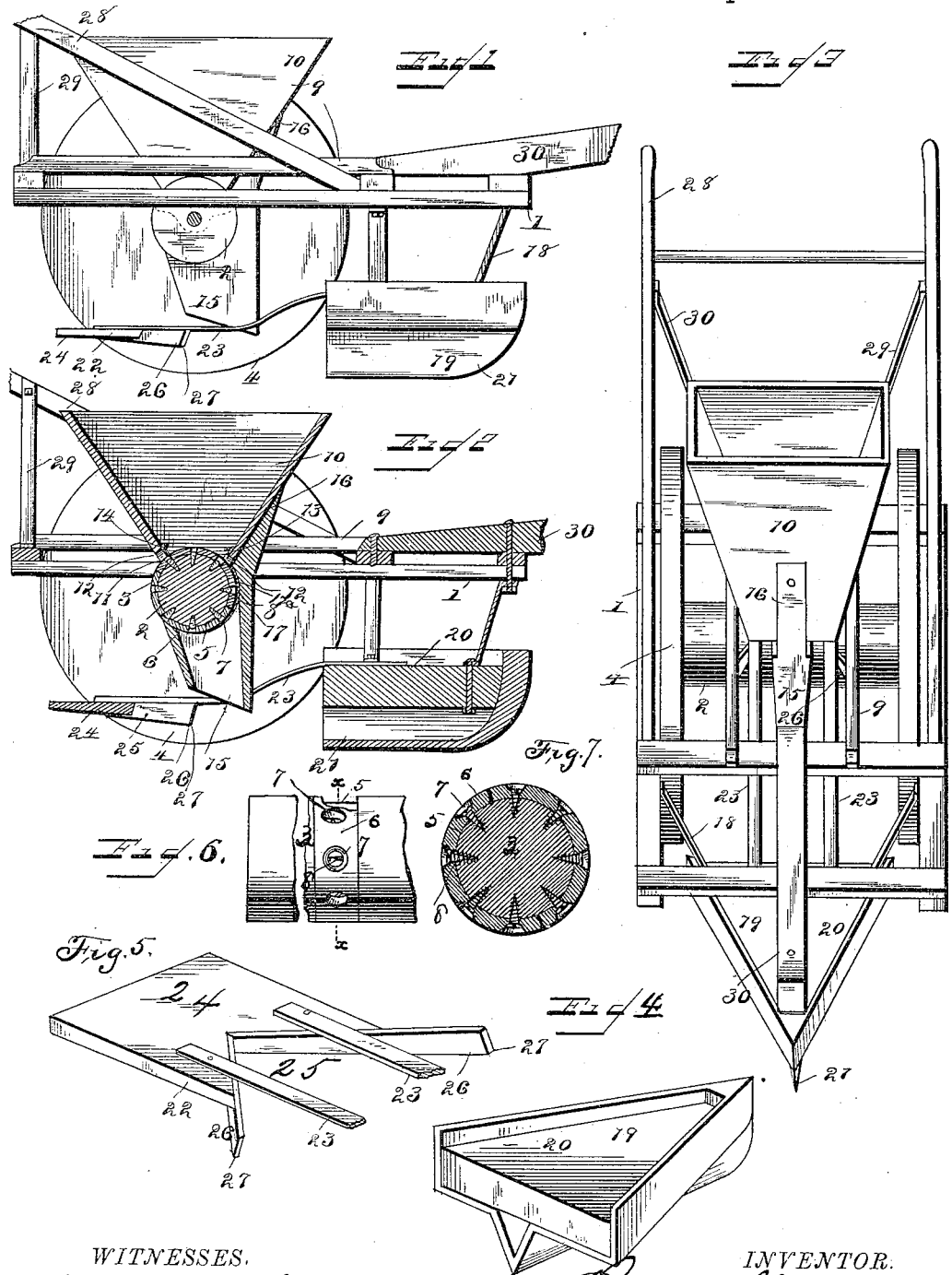
WITNESSES.
J. L. Durand
J. F. Reily
INVENTOR.
Rufus Gardner,
by Louis Bagger & Co.
Attorneys

UNITED STATES PATENT OFFICE.

RUFUS GARDNER, OF SCOTLAND NECK, NORTH CAROLINA.

PEANUT-PLANTER.

SPECIFICATION forming part of Letters Patent No. 381,357, dated April 17, 1888.

Application filed December 14, 1887. Serial No. 257,888. (No model.)

*To all whom it may concern:*

Be it known that I, RUFUS GARDNER, a citizen of the United States, and a resident of Scotland Neck, in the county of Halifax and State of North Carolina, have invented certain new and useful Improvements in Peanut-Planters; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my new and improved peanut-planter with one of the wheels removed. Fig. 2 is a central longitudinal vertical sectional view of the same. Fig. 3 is a perspective front view. Fig. 4 is a perspective view of the furrow-opener, and Fig. 5 is a perspective view of the coverer. Fig. 6 is a front detail view of the feed-cylinder, and Fig. 7 is a sectional view through the broken lines *x x*.

The same numerals of reference indicate corresponding parts in all the figures.

My invention consists in a new and improved peanut-planter, which will be hereinafter fully described and claimed.

Referring to the several parts by their designating-numerals, 1 indicates the rectangular frame of my peanut-planter, which is supported on the ends of the axle 2, and upon this axle are mounted the feed-cylinder 3 and the drive-wheels 4 4, the drive-wheels being secured rigidly to the ends of the cylinder and lying within the frame 1. The feed-cylinder is formed centrally with an annular groove or recess, 5, and in this central groove is secured a cast-iron band, 6, which is formed in two semicircular sections, with a series of holes, 7, the sections of the band being secured upon the cylinder by screws 8, which are screwed down into the cylinder through these holes. These holes in the metal band are for the reception of the nuts to be planted, and form, in fact, seed-cups, the size and capacity of which can be regulated by screwing down or raising the screws, the heads of which form the bottom of the said openings or "cups," and it will be seen that by this construction the amount of peanuts planted in each hill can be regulated as desired, so as to plant few or many. When large varieties of peas are to be planted, the band here shown can be removed and replaced by one having fewer cups to increase the distance between the hills.

Upon the main frame 1, on cross-bars 9 9, is secured and supported the hopper 10, the bottom of which is formed with the usual opening, 11, the sides of this opening being curved up to conform to and fit closely the feed-cylinder. The lower open end of the hopper fits down upon the top of the feed-cylinder, and is formed at its front and rear end with a small slot or aperture, 12 12, the said openings being covered on the inner side of the hopper by the brushes 13 14, which prevent more than the requisite number of nuts being carried by the cups to the spout, while the slot under the brush prevents the pea from being bruised should one project a little above the edge of the cup in which it is contained.

15 indicates the spout, which is of the form shown, being rounded at its upper forward end to fit up around the curved surface of the feed-cylinder, while its forward upper extremity, 16, projects up and is bolted to the front side of the hopper. The upper front surface, $17^a$, of the spout is curved in this circular form to retain the peas in the cups until the cup arrives at the point of release, and this curved front side of the spout is covered with a soft-leather strip, 17, to prevent bruising the pea in its passage, as will be readily seen.

At the front end of the frame 1 is secured by the metal braces 18 the opener 19 in the position shown in the drawings. This opener is V-shaped in outline, with its point forward, its upper part, 20, being flat, while its point and bottom are sharpened and shaped like the bow of a boat, as shown in the drawings, especially in the detail view, Fig. 5, of the drawings. The flat under side of the top part of the opener will prevent the earth from being scattered, while the sharp bottom portion, 21, will open a clean furrow.

22 indicates the coverer, which is connected to the opener by the springs 23 23, which are curved so as to give the requisite pressure upon the soil covering the peas. The coverer, which should be of cast-iron, is formed of a flat plate, 24, the rear edge of which is rounded on its lower side. The front end of this plate is formed with the V-shaped opening or recess 25, the edges of which V-shaped recess are formed with the edge flanges, 26 26, which increase in depth from the inner end or point of the V to their outer ends, 27, which project beyond the sides of the plate 24, as clearly shown in the detail view, Fig. 4, of the drawings.

28 indicates the handles, which are braced from the frame 1 by the braces 29, and 30 indicates the tongue at the front of the said frame.

In operation the peanuts to be planted are placed in the hopper and feed the cups in the metal band 6, the size of the said cups having been adjusted by the screws, the heads of which form their bottom, as before described. It will now be seen that as the planter is drawn forward the opener will open the furrow, the peas will be discharged from the cups into the same, and the coverer will cover in the furrow. The edge flanges of the V shaped opening in the front end of the coverer will draw the dirt into the furrow, as will be readily seen, while the flat rear portion of the coverer will press the earth firmly down on the peas with the requisite amount of pressure obtained from the springs 23 23. The slot under the brush at the bottom of the hopper will prevent the peas from being broken or bruised, while the soft leather along the front upper surface of the peculiarly-formed hopper will hold the peas in the cups until they reach the proper point to be discharged through the spout, and will also prevent them from being bruised on their passage. The opener will open a clean clear furrow.

From the foregoing description, taken in connection with the accompanying drawings, the construction, operation, and advantages of my invention will be readily understood. It will be seen that my new and improved peanut-planter is simple and strong in construction and exceedingly efficient in its operation.

Having thus described my invention, what I claim, and desire to secure by Letters Patent of the United States, is—

In a peanut-planter, the combination of the drive-wheels and the cylinder, the metal band formed in sections and with the series of cups or openings, and the screws working through the said openings, the hopper having the slots in its lower end and the brushes secured at the inner ends of the said slots, and the spout having the rounded recessed upper end and the strip of leather secured across the upper curved end of the spout, substantially as and for the purpose set forth.

In testimony that I claim the foregoing as my own I have hereunto affixed my signature in presence of two witnesses.

RUFUS GARDNER.

Witnesses:
W. M. SHIELDS,
J. HARPER ALEXANDER.